(12) United States Patent
Yang et al.

(10) Patent No.: US 10,254,458 B2
(45) Date of Patent: Apr. 9, 2019

(54) LAMINATE

(71) Applicant: LG Chem, Ltd., Seoul (KR)

(72) Inventors: Se Woo Yang, Daejeon (KR); Sung Hyun Nam, Daejeon (KR); Yoon Tae Hwang, Daejeon (KR); Jong Hyun Jung, Daejeon (KR); Suk Ky Chang, Daejeon (KR); Kyun Il Rah, Daejeon (KR)

(73) Assignee: LG Chem, Ltd. (KR)

(*) Notice: Subject to any disclaimer, the term of this patent is extended or adjusted under 35 U.S.C. 154(b) by 80 days.

(21) Appl. No.: 14/787,427

(22) PCT Filed: Jun. 19, 2014

(86) PCT No.: PCT/KR2014/005440
§ 371 (c)(1),
(2) Date: Oct. 27, 2015

(87) PCT Pub. No.: WO2014/204247
PCT Pub. Date: Dec. 24, 2014

(65) Prior Publication Data
US 2016/0070042 A1 Mar. 10, 2016

(30) Foreign Application Priority Data
Jun. 19, 2013 (KR) .................. 10-2013-0070530

(51) Int. Cl.
*G02B 5/30* (2006.01)
*B32B 27/08* (2006.01)
(Continued)

(52) U.S. Cl.
CPC .......... *G02B 5/305* (2013.01); *B29D 11/0073* (2013.01); *B29D 11/00644* (2013.01);
(Continued)

(58) Field of Classification Search
CPC .................. G02B 5/305; B29D 11/00644
(Continued)

(56) References Cited

U.S. PATENT DOCUMENTS

2004/0212885 A1 10/2004 Mizushima et al.
2006/0108708 A1* 5/2006 Wakita .................. B32B 27/08
264/248

(Continued)

FOREIGN PATENT DOCUMENTS

CN 102326105 A 1/2012
CN 102338902 A 2/2012
(Continued)

OTHER PUBLICATIONS

Machine_English_translation_JP_2006045250_A; Base Film for Marking Sheet; dated Feb. 16, 2006; EPO; whole document.*

(Continued)

*Primary Examiner* — Tahseen Khan
(74) *Attorney, Agent, or Firm* — Lerner, David, Littenberg, Krumholz & Mentlik, LLP

(57) ABSTRACT

Provided are a base film, a laminate, and a method of forming a polarizing film. Particularly, a base film which may effectively form a polarizing film having a thickness of approximately 10, 8, 7, 6, or 5 μm or less and exhibiting excellent functions such as polarizing performance, a laminate, and a method of forming the same are provided. Therefore, a polarizing film may be formed by preventing tearing or curling during an elongation process, and easily elongating a polarizing material such as a polyvinylalcohol-based resin.

14 Claims, 1 Drawing Sheet

(51) Int. Cl.
  *B32B 27/30* (2006.01)
  *B32B 27/40* (2006.01)
  *B29D 11/00* (2006.01)
  *B29K 29/00* (2006.01)
  *B29K 75/00* (2006.01)
  *B29L 9/00* (2006.01)
  *B29L 11/00* (2006.01)

(52) U.S. Cl.
  CPC ............ *B32B 27/08* (2013.01); *B32B 27/306* (2013.01); *B32B 27/40* (2013.01); *G02B 5/3033* (2013.01); *B29K 2029/04* (2013.01); *B29K 2075/00* (2013.01); *B29K 2995/0077* (2013.01); *B29K 2995/0097* (2013.01); *B29L 2009/00* (2013.01); *B29L 2011/0066* (2013.01); *B32B 2307/42* (2013.01); *B32B 2307/51* (2013.01); *B32B 2307/54* (2013.01); *B32B 2307/5825* (2013.01); *B32B 2457/202* (2013.01)

(58) Field of Classification Search
  USPC ........................................................ 428/212
  See application file for complete search history.

(56) References Cited

U.S. PATENT DOCUMENTS

| | | | |
|---|---|---|---|
| 2006/0109403 | A1 | 5/2006 | Murakami et al. |
| 2008/0269454 | A1* | 10/2008 | Chen ................. C08G 18/4018 528/67 |
| 2009/0252897 | A1* | 10/2009 | Matsuo ................... B32B 27/32 428/1.31 |
| 2009/0286031 | A1 | 11/2009 | Shi et al. |
| 2009/0305049 | A1* | 12/2009 | Kobuchi ............ B29D 11/0073 428/414 |
| 2010/0157426 | A1* | 6/2010 | Matsunami ........... B29C 55/023 359/487.06 |
| 2011/0315306 | A1 | 12/2011 | Goto et al. |
| 2012/0055607 | A1* | 3/2012 | Kitagawa ................ B32B 41/00 156/64 |
| 2012/0250142 | A1* | 10/2012 | Kobuchi ................... G02F 1/00 359/321 |
| 2012/0300300 | A1* | 11/2012 | Yasui .................... C09J 133/066 359/492.01 |
| 2012/0327512 | A1* | 12/2012 | Goto .................... G02B 5/3033 359/487.02 |
| 2013/0100529 | A1 | 4/2013 | Kitagawa et al. |
| 2013/0135725 | A1* | 5/2013 | Mori ..................... B29C 55/026 359/487.02 |
| 2014/0072731 | A1* | 3/2014 | Seo ........................ C09J 163/00 428/1.53 |

FOREIGN PATENT DOCUMENTS

| | | |
|---|---|---|
| CN | 102385086 A | 3/2012 |
| CN | 102736165 A | 10/2012 |
| CN | 103108738 A | 5/2013 |
| JP | 54-023950 | 2/1979 |
| JP | 561104847 A | 5/1986 |
| JP | 563243143 A | 10/1988 |
| JP | 2000338329 A | 12/2000 |
| JP | 2005104048 A | 4/2005 |
| JP | 2006045250 a * | 2/2006 |
| JP | 2006233366 A | 9/2006 |
| JP | 2011121253 A | 6/2011 |
| JP | 4751481 B1 | 8/2011 |
| JP | 4751486 B2 | 8/2011 |
| JP | 2012-159778 A | 8/2012 |
| JP | 2012145766 A | 8/2012 |
| JP | 2012-215775 A | 11/2012 |
| JP | 2013011838 A | 1/2013 |
| KR | 10-2006-0133215 A | 12/2006 |
| KR | 10-0755763 B1 | 9/2007 |
| KR | 10-0812579 B1 | 3/2008 |
| KR | 10-2011-0006679 A | 1/2011 |
| KR | 10-2011-0069352 A | 6/2011 |
| KR | 10-1175700 B1 | 8/2012 |
| KR | 20120087068 A | 8/2012 |
| KR | 10-2013-0013471 A | 2/2013 |
| KR | 10-1274056 B1 | 6/2013 |
| TW | 201231277 A | 8/2012 |
| WO | 2010100917 A1 | 9/2010 |
| WO | WO2013055158 a2 * | 4/2013 |

OTHER PUBLICATIONS

International Search Report from PCT/KR2014/005441, dated Sep. 23, 2014.
International Search Report for Application No. PCT/KR2014/005440 dated Sep. 26, 2014.
International Written Opinion for Application No. PCT/KR2014/005440 dated Sep. 26, 2014.
International Written Opinion for Application No. PCT/KR2014/005441 dated Sep. 23, 2014.
IPO Search Report from Taiwan Application No. 103121222, dated Apr. 20, 2016.
Search Report from Office Action issued in Chinese Application No. 201480033304.6, dated Feb. 21, 2017.

* cited by examiner

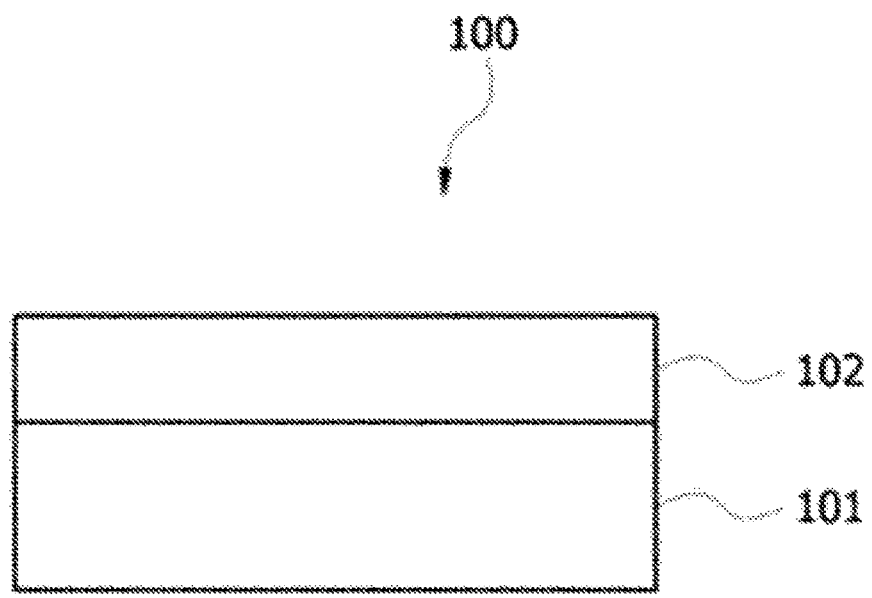

LAMINATE

CROSS-REFERENCE TO RELATED APPLICATIONS

The present application is a national phase entry under 35 U.S.C. § 371 of International Patent Application No. PCT/KR2014/005440, filed Jun. 19, 2014, which claims the priority from Korean Application No. 10-2013-0070530, filed Jun. 19, 2013, in the Korean Intellectual Property Office, the disclosures of which are incorporated herein by reference.

FIELD

The present application relates to a base film, a laminate, and a method of forming a polarizing film.

BACKGROUND

A method of forming a polarizing film by adsorbing and orienting a dichroic material to a polyvinylalcohol-based resin (hereinafter, referred to as "PVA resin") is well known. A representative use for a polarizing film is a display device such as a liquid crystal display (LCD). For example, a PVA resin-based polarizing film having a thickness of approximately 60 to 80 μm is attached to both surfaces of a liquid crystal panels of an LCD.

A PVA resin is hydrophilic, and thus a polarizing film is sensitive to change in temperature or humidity, easy to be elongated or contracted, and easy to have a failure such as curling. Accordingly, to inhibit elongation and contraction and reduce effects of a temperature and a humidity, a protective film is generally adhered to both surfaces of the PVA resin polarizing film. However, when the polarizing film has a large thickness, elongation and contraction are difficult to be inhibited, a stress is generated when the polarizing film is adhered to a liquid crystal panel, and staining on a display may be generated. In addition, recently, there is an increasing demand for a thin device or a device consuming low energy, and a demand for a thin polarizing film is also increasing.

For example, a process of forming a thin polarizing film is disclosed in the patent document 1.

PRIOR ART DOCUMENT

Patent Document

PATENT DOCUMENT 1: Korean Patent No. 1175700.

DESCRIPTION

Technical Object

The present application is directed to providing a base film, a laminate, and a method of forming a polarizing film.

Technical Solution

In one aspect, the present application provides a base film. The illustrative base film may be, for example, a film used in a process of elongating a material that can exhibit a polarization function such as a PVA resin (hereinafter, referred to as an elongation film or an elongation base film). Here, as shown in FIG. 1, an elongation process may be performed by stacking a layer 102 (hereinafter, referred to as a "polarizing material layer") including a material that can exhibit a polarization function by elongation on one or both surfaces of a base film 101 to form a laminate 100, and elongating the laminate.

To more effectively perform such an elongation process, and finally obtain a highly functional thin polarizing film, characteristics of the base film may be determined in consideration of a polarizing material layer elongated together.

Here, the characteristics of the base film may include, for example, various physical properties that can be measured by a tensile test. Tensile curves confirmed in the tensile test may be generally classified into a load-versus-elongation curve shown by a relationship of elongation (mm) to a applied load; and a stress-versus-strain curve shown by a relationship of an engineering strain to an engineering stress, and the characteristics defined in the specification may be, unless particularly defined otherwise, confirmed from the latter, that is, the stress-versus-strain curve shown by a relationship of an engineering strain to an engineering stress.

In the present application, the tensile curve is illustrated by the following method. First, a sample subjected to measurement of a tensile curve is prepared to have a size of 15 mm×70 mm (width×length). The width and length of the sample are lengths excluding parts fixed to a tensile tester for elongation. Afterward, the sample is fixed to the tensile tester and elongated in a vertical direction at room temperature and an elongation speed of approximately 300 mm/min until it is broken, and then a graph of a force measured according to a distance until the sample is broken (X axis: distance, Y axis: force) is illustrated. Afterward, the graph is converted into a graph of elongation and tensile strength (X axis: elongation, Y axis: tensile strength) by applying an area and a thickness of the sample, and each tensile characteristic that will be described below may be measured from the converted graph. The term "room temperature" used herein is a natural temperature which is not increased or decreased, and may be approximately 10 to 30 or 25 or 23° C. In addition, unless particularly defined otherwise, physical properties correspond to those measured at room temperature.

The base film may be selected such that, for example, an absolute value of a difference (A-B) between an integral (A) of the tensile curve and an integral (B) of the polarizing material layer measured by the same method ranges from 1,500 to 10,000 Nmm. The absolute value of the difference may be, in another example, approximately 2,000, 2,500, 3,000, 3,500, or 4,000 Nmm or more. In addition, the absolute value of the difference may be, in another example, approximately 9,000, 8,000, 7,000 or 6,500 Nmm or less.

For example, the base film may be selected such that an absolute value of a difference between the tensile strength of the base film and the tensile strength of the polarizing material layer ranges from approximately 0.5 to 40 MPa. Here, the tensile strength refers to a value obtained by dividing the maximum tensile load until the sample is broken in a tensile test by a cross-sectional area of the sample before elongation.

The base film may be selected such that, for example, an absolute value of a difference between an elongation of the base film and an elongation of the polarizing material layer ranges from 15 to 500%. The absolute value of the difference may be, in another example, 20% or more. In addition, the absolute value of the difference may be, in another example, 400, 300, 200, or 160% or less.

The base film may be selected such that, for example, an absolute value of a difference between a yield point of the base film and a yield point of the polarizing material layer ranges from 1 to 50 MPa. The absolute value of the difference may be, in another example, 3 or 5 MPa or more. In addition, the absolute value of the difference may be, in another example, 45, 40, or 35 MPa or less.

The base film may be selected such that, for example, an absolute value of a difference between an elastic limit of the base film and an elastic limit of the polarizing material layer ranges from 1,000 MPa or less. The absolute value of the difference may be, in another example, 50, 100, 150, 200, or 230 MPa or more. In addition, the absolute value of the difference may be, in another example, 900, 800, 700, or 660 MPa or less.

The absolute values of the characteristics of the base film described above are determined by characteristics of the applied polarizing material layer without particular limitation.

However, to prevent a failure by contraction after elongation of the polarizing material layer, the base film may be required to satisfy Equation 1:

$$E/R \geq 5 \qquad \text{[Equation 1]}$$

In Equation 1, E is an elongation (unit: %) of the elongation base film measured at room temperature, and R is a recovery rate (unit: %). Here, the elongation may be calculated from a tensile curve obtained by performing the tensile test described above at the measuring temperature.

In addition, the recovery rate is a value obtained by assigning a vertical length (T) of the base film to the Equation $[100 \times (T-A)/A]$. The vertical length (T) is measured after cutting the base film so as to have a size of 50 mm×100 mm (width×length), preparing a laminate by laminating a PVA film having the same width and length as the base film and having a thickness of 30 μm on one surface of the base film, elongating the laminate as five times as the original length in a lengthwise direction in water (temperature: 60° C.), taking the elongated laminate out of the water, removing the PVA film, and then maintained at room temperature for 1 hour. The "A" in the Equation is the length before elongation of the base film.

When a ratio (E/R) according to Equation 1 is adjusted to be in the range, a polarizing film which is very thin and has excellent polarization function or transmissivity due to effective elongation in the following elongation process may be obtained. The ratio (E/R) may be, in another example, 10, 15, 20, 25, or 30 or more. The ratio (E/R) may be, in another example, 600, 500, 400, 300, 200, 100, 70, 65, 60, 55, 50, 45, or 40 or less.

The base film may satisfy Equation 1, and have the elongation in a range of approximately 200 to 1500%. The elongation may be, in another example, approximately 250 or 300% or more. The elongation may be, in another example, approximately 1400, 1300, 1200, 1100, 1000, 900, 800, 700, 600 or 550% or less.

In addition, the recovery rate of the base film may be 30, 25, or approximately 20% or less. The recovery rate may be approximately 5, 10, or 15% or more.

In the base film, an integral of a tensile curve measured by the above-described method (a graph (X axis: elongation, Y axis: tensile strength) of the elongation measured by elongating the sample to be broken and a tensile strength) may be in a range of 2000 to 10,000 Nmm The integral may be, in another example, 2500, 3000, 3500, or 4000 Nmm or more. In still another example, the integral may be 9000, 8000, or 7600 Nmm or less. Such a range may be advantageous for forming a very thin and highly functional polarizing film in the following elongation process.

A tensile strength of the base film may range from, for example, 45 to 200 MPa. The tensile strength may be, in another example, 50 MPa or more. The tensile strength may be, in still another example, 150 or 100 MPa or less. Such a range may be advantageous for forming a very thin and highly functional polarizing film in the following elongation process.

A yield point of the base film may range from, for example, 10 to 150 MPa. The yield point may be, in another example, 15 MPa or more. The yield point may be, in still another example, 100 MPa or less. Such a range may be advantageous for forming a very thin and highly functional polarizing film in the following elongation process.

An elastic limit of the base film may range from, for example, 200 to 1,000 MPa. The elastic limit may be, in another example, 250, 300, or 350 MPa or more. The elastic limit may be, in another example, 900, 850, or 800 MPa or less. Such a range may be advantageous for forming a very thin and highly functional polarizing film in the following elongation process.

When the base film is selected to satisfy at least one of the above-described physical properties in the relationship with the polarizing material layer, a very thin polarizing film having a thickness of approximately, for example, 10, 8, 7, 6, or 5 μm or less and exhibiting high functions may be effectively formed by an elongation process, and tearing or curling of the polarizing film during this process may also be effectively prevented.

A type of the base film may be selected to satisfy at least one of the physical properties without particular limitation. The base film may be a cellulose-based film formed of triacetyl cellulose (TAC); a polyethersulfone-based film; a polyolefin-based film such as a polyethylene or polypropylene film, an ethylene-acetic acid vinyl copolymer film, an ethylene-alkyl (meth)acrylate copolymer (here, the alkyl is an alkyl group having 1 to 4 carbon atoms) film, an ethylene-alpha-olefin copolymer film, or a propylene-alpha-olefin copolymer film; a polyvinylchloride film; an elastomer film; an acryl film; or a base film formed of a polymer such as urethane. However, for example, an amorphous poly(ethylene terephthalate) (PET) film or a polymethylpentene film is not suitable since it exhibits a different tensile behavior from a common polarizing material layer, that is, a PVA resin layer, which will be described below.

As the base film, a thermoplastic polyurethane (TPU) film may be used. The "TPU film" used herein may be a monolayer film including a TPU film as a main component, or a multilayer film including at least a TPU film. Such a TPU film may be a non-elongation film, or a uniaxially-, biaxially-, or multiaxially-elongated film. As the TPU film, a polyester TPU film, a polyether TPU film, or a polycaprolactone TPU film is known, and a suitable type may be selected in consideration of the characteristic from the known materials. For example, as the base film, a polyester TPU film may be used. As the TPU film, an aromatic or aliphatic TPU film may be used.

The TPU film is generally formed by reacting a polyol component, a polyvalent isocyanate component, and a chain extender component, and the TPU prepared as described above contains a soft segment and a hard segment. Generally, the soft segment is a main component of the polyol component, and the hard segment includes an urethane or urea bond created by a reaction of the polyvalent isocyanate and a chain extender, and a non-reacted part of the components. Accordingly, in the TPU film, the tensile characteristic may be easily ensured by adjusting ratios of the soft and hard segments through control of the components. Accordingly, the TPU film used as a base film may be a reaction product of a mixture including a polyol, polyvalent isocyanate, and a chain extender.

A type of the polyol included in the mixture is not particularly limited. For example, generally, to form the soft segment, at least one component selected from the group consisting of an aliphatic or aromatic polyether glycol, an aliphatic or aromatic polyester glycol, and a polycaprolactone glycol may be used as the polyol. For example, the polyester polyol may be produced by reacting a glycol with a dibasic acid such as adipic acid, sebasic acid, isophthalic acid, dimethyl terephthalate, terephthalic acid, dimethyl phthalate, phthalic acid, dimethyl isophthalic acid, dimethyl naphthalene 2,6-dicarboxylic acid, oxalic acid, malonic acid, succinic acid, glutaric acid, azelaic acid, nona acid, or dodeca-deca acid. In consideration of easiness in ensuring or adjusting the above-described physical properties, a polyol having a weight average molecular weight of approximately 500 to 5,000 may be used.

A type of the chain extender included in the mixture is not particularly limited, and a component generally used in forming a hard segment may be used. Such a component may be an aliphatic diol having 1 to 20, 1 to 16, 1 to 12, or 1 to 8 carbon atoms such as ethyleneglycol, 1,6-hexane diol, 1,4-butane diol, 1,5-pentane diol, 1,6-pentane diol, neopentyl glycol, or 1,4-cyclohexanedimethanol.

A type of the polyvalent isocyanate compound included in the mixture may be, but is not particularly limited to, a component generally used in formation of a hard segment. Such a component may be, but is not limited to, an aliphatic or aromatic diisocyanate such as toluene diisocyanate, xylene diisocyanate, diphenylmethane diisocyanate, hexamethylene diisocyanate, isophorone diisocyanate, tetramethylxylene diisocyanate, methylenediphenyl diisocyanate, or naphthalene diisocyanate.

The mixture may further include various components known to be applied to the formation of a TPU film as well as the above-described components.

Ratios of the components in the mixture are not particularly limited, and the soft and hard segments in the TPU film may be present in suitable ratios to exhibit the above-described characteristics. In one example, a total weight of the polyvalent isocyanate component and the chain extender in the mixture may be approximately 1 to 90 parts by weight with respect to 100 parts by weight of the polyol component. Unless particularly defined otherwise, the unit "parts by weight" used herein refers to a weight ratio between components. For example, the mixture may include 1 to 50 or 5 to 45 parts by weight of the polyvalent isocyanate compound with respect to 100 parts by weight of the polyol component and approximately 0.1 to 30 or 0.5 to 20 parts by weight of the chain extender with respect to 100 parts by weight of the polyol component. In such a range, the soft and hard segments in TPU may be present in suitable ratios intended by the present application.

A method of preparing TPU by a reaction of the mixture, and a method of forming a film using TPU are not particularly limited, and known methods of preparing TPU and forming a film may be employed without limitation.

A thickness of the base film is not particularly limited, and may be selected within the range exhibiting the above-described characteristics. For example, the thickness may range from approximately 50 to 300 or 100 to 200 µm, but the present application is not limited thereto.

In another aspect, the present application provides a laminate including the base film and a polarizing material layer formed on one or both surfaces of the base film, for example, an elongation laminate. Such a laminate may be elongated, thereby forming a film exhibiting a polarization function (hereinafter, a polarizing film).

A type of the polarizing material layer is not particularly limited as long as it can only extract light oscillating in one direction from incident light oscillating in various directions. Such a polarizing material layer may be, for example, a layer including a PVA resin. The PVA resin may be obtained by gelating, for example, a polyvinylacetate-based resin. In the polyvinylacetate-based resin that can be used herein, in addition to a homopolymer of vinyl acetate, a copolymer of vinyl acetate and a different monomer copolymerizable therewith may be included. Here, an example of a monomer that can be copolymerized with vinyl acetate may be, but is not limited to, one or a mixture of at least two of unsaturated carbonic acids, olefins, vinyl ethers, unsaturated sulfonic acids, and acryl amides having an ammonium group. A gelation degree of the PVA resin may be approximately 85 to 100 mol %, and preferably 98 mol % or more. The PVA resin may be further modified, and for example, polyvinyl formal or polyvinyl acetal modified by aldehydes may also be used. In addition, a degree of polymerization of the PVA resin may be approximately 1,000 to 10,000 or 1,500 to 5,000.

A method of forming the polarizing material layer including a PVA resin on one or both surfaces of the base film is not particularly limited. For example, the polarizing material layer may be formed by coating a coating solution prepared by dissolving a material such as a PVA resin in a solvent, for example, water, to the base film, or stacking a film formed by laminating a material such as a PVA resin (hereinafter, referred to as a polarization functional film), for example, a PVA resin film on the base film. Unless particularly defined otherwise, a method of adhering a polarization functional film to the base film among the methods in consideration of a suitable elongation process and the function of a polarizing film obtained after elongation may be used. In this process, the polarization functional film may be directly stacked on the base film without a separate layer, or may be stacked using an adhesive. A type of an adhesive layer that can be used in the process is not particularly limited, and a water-based PVA-based adhesive layer generally used to adhere a protective film to a polarizing film in the preparation of a polarizing plate may be used. In addition, known adhesive treatment such as corona treatment or primer treatment may be performed on a surface of the base film having the polarizing material layer.

In the laminate, a dichroic material may be stained on the polarizing material layer. As a dichroic material, any one exhibiting a suitable dichroic property and known to be used for forming a polarizing film may be used. As the dichroic material, an iodide, an organic dye, and a mixture thereof may be used, and the iodide may be, but is not limited to, lithium iodide, sodium iodide, zinc iodide, aluminum iodide, lead iodide, copper iodide, valium iodide, calcium iodide, tin iodide, or titanium iodide.

In the laminate, a thickness (thickness before elongation) of the polarizing material layer may be selected in a suitable range in consideration of a thickness after elongation without particular limitation. For example, the thickness of the polarizing material layer may be in a range of 15 to 100 µm. In another example, the thickness may be 20 to 90, 20 to 80, 20 to 70, 20 to 60, 20 to 50, or 20 to 40 µm.

In still another aspect, the present application provides a method of forming a polarizing film including elongating the laminate, that is, a laminate including a base film and a polarizing material layer formed on one or both surfaces of the base film.

Before elongating the laminate, a dying process of dying the polarizing material layer with a dichroic material as described above maybe performed. The dying process may be performed by, for example, dipping the laminate in a dying solution. The dying solution may be prepared by, for example, dissolving the above-described dichroic material in a solvent. As the solvent of the dying solution, generally, water is used. A ratio of the dichroic material in the dying solution may be particularly limited. Generally, the dying solution may include approximately 0.1 to 4.3 parts by weight of the dichroic material with respect to 100 parts by weight of the solvent. As the dichroic material, the above-described material may be used. When the iodine is used as the dichroic material, an iodide may be further added to the dying solution to stimulate dissolution of an iodine and enhance dying efficiency. The iodide may be generally added at approximately 0.02 to 20 or 0.1 to 10 parts by weight with respect to 100 parts by weight of the solvent, but the present application is not limited thereto. The iodide may be, but is not limited to, potassium iodide, lithium iodide, sodium iodide, zinc iodide, aluminum iodide, lead iodide, copper iodide, barium iodide, calcium iodide, tin iodide, or titanium iodide. Generally, a dipping time in the dying solution may be approximately 5 seconds to 5 minutes, and a temperature of the dying solution in the process may be generally in a range of 20 to 50° C., but the present application is not limited thereto.

An elongation process may be performed after or without the dying process. The elongation process may be performed by a known method without particular limitation. The elongation of the laminate may be performed in a solution, for example, an aqueous solution. A temperature of the solution in which the elongation process is performed may be, but is not particularly limited to, generally, 85° C. or less, 20 to 70, or 30 to 65° C. as long as suitable elongation may be performed. The elongation may be performed such that a thickness of the elongated polarizing film is in a range of approximately 10, 8, 7, 6, or 5 µm or less. The lower limit of the thickness of the elongated polarizing film may be, but is not particularly limited to, approximately, for example, 0.5, 1, 1.5, 2, or 2.5 µm or more. To this end, the elongation may be performed in a draw ratio of approximately 2 to 15 or 5 to 15 folds. Within the above-described draw ratio, a dichroic material of the polarizing material layer or the polarizing film may be suitably oriented.

When needed, the elongation process may also be formed with a crosslinking process. The crosslinking process may be performed by, for example, dipping the laminate in a boric acid aqueous solution, and when the elongation process is performed in the boric acid aqueous solution, it may be performed with the crosslinking process. The crosslinking process may be an insolubilization process for preventing a PVA resin of a swallowed polarizing material layer or polarizing film from being dissolved in water.

The boric acid aqueous solution may be obtained by dissolving boric acid or borate in water. Other than the boric acid or borate, a boron compound such as boron, glyoxal, or glutaraldehyde may be used. A concentration of the boric acid is not particularly limited, and may be adjusted such that boric acid is generally present at 1 to 10 parts by weight with respect to 100 parts by weight of water. In the boric acid aqueous solution, for example, an iodide may be added to prevent elution of iodine adsorbed to a material for the polarization functional layer, that is, a PVA resin layer. A concentration of the iodide may generally be 0.05 to 15 or 0.5 to 8 wt %. The iodide may be the material described in the dying process. A dipping time in the boric acid aqueous solution may generally be approximately 15 seconds to 5 minutes, and a temperature of the boric acid aqueous solution may generally be in a range of 20 to 70° C.

The above-described crosslinking process may be performed before the dying process. In such a case, crosslinking, dying, and elongation may be sequentially performed using the boric acid aqueous solution. To form a thin polarizing film, a material for the polarizing material layer, for example, a PVA resin may be dissolved in the dying solution, and thus it may be more effective that the crosslinking process is performed before the dying process. When needed, a separate crosslinking process using a boric acid aqueous solution may be performed to add boric acid missed from the dying process prior to the elongation process.

A washing process may be performed after the elongation process. The washing process is a process of washing residues of the laminate film including the elongated polarizing film. When such treatment is insufficiently performed, boric acid may be educed from a thin polarizing film after drying the laminate. For example, the washing may be performed in a washing solution including potassium iodide to prevent dissolution of a material such as a PVA resin. A concentration of the potassium iodide in the washing solution may generally be approximately 0.5 to 10 wt %. The washing solution may generally have a temperature of approximately 10 to 50° C., and a dipping time of approximately 1 second to 1 minute, but the present application is not limited thereto.

Subsequently, a drying process may be performed. The drying process may be performed by a suitable method, for example, natural drying, wind drying, or heat drying. Drying temperature and time are not particularly limited, and may be adjusted to perform suitable drying.

The laminate including the elongated polarizing film may be used without treatment, and when needed, may be used after peel-off of the base film. When needed, the base film may be peeled from the polarizing film through a suitable transfer process, and transferred to another optical functional film.

EFFECT

According to the present application, a base film which can effectively form a polarizing film having a thickness of approximately 10, 8, 7, 6, or 5 µm or less and exhibiting excellent functions such as polarization performance, a laminate, and a method of forming the same are provided. Therefore, a polarizing film can be formed by preventing tearing or curling during an elongation process, and easily elongating a polarizing material such as a PVA resin.

BRIEF DESCRIPTION OF THE DRAWINGS

FIG. 1 is a cross-sectional view of an illustrative laminate.

ILLUSTRATIVE EMBODIMENTS

Hereinafter, the present application will be described in detail with reference to examples and comparative examples, but the scope of the present application is not limited to the following examples.

The properties in the examples and comparative examples are measured as below.

1. Evaluation of Tensile Characteristic

A tensile characteristic of a base film or a polarizing material layer (a PVA resin film in Example or Comparative Example) was evaluated by the following method. A sample was prepared by cutting the base film or polarizing material layer of Example or Comparative Example to have a size of 15 mm×90 mm (width×length). Subsequently, upper and lower parts of the sample were taped by 10 mm each, and fixed to a measuring device (XP plus, TA). Subsequently, a graph (X axis: distance, Y axis: force) of a force measured according to a distance until the sample was broken by being elongated in a vertical direction at an elongation speed of 300 mm/min and room temperature was illustrated, and converted into a graph (X axis: elongation, Y axis: tensile strength) of elongation and tensile strength by applying the area and thickness of the sample to evaluate tensile characteristics. A method of evaluating tensile characteristics such as a tensile modulus, a modulus of elasticity, an elongation, etc. from the tensile curve is known in the art.

2. Evaluation of Recovery Rate

A recovery rate was evaluated by the following method. First, a base film of Example or Comparative Example was cut to have a size of 50 mm×100 mm (width×length). Afterward, a PVA film having the same size as the base film and a thickness of 30 μm was adhered to one surface of the base film, thereby forming a laminate. Here, the adhesion between the PVA film and the base film was performed using a general water-based PVA-based adhesive. Afterward, the laminate was dipped in water (temperature: 60° C.) and elongated fivefold the original length in a vertical direction. Then, the resulting sample was taken out of water to peel the PVA film, and maintained at room temperature for 1 hour, and then a vertical length (T) of the base film was measured. Subsequently, the measured length (T) was assigned to Equation $\lceil 100\times(T-A)/A\rceil$, thereby obtaining a recovery rate. In the Equation, A is a vertical length of the base film before elongation.

3. Evaluation of Melt Index (MI)

A melt index was measured with a weight of a sample passing through an orifice having a diameter of 2.095 mm with a load of 500 g at 215° C. for 10 minutes according to ASTM D1238 (unit: g/10 min)

4. Evaluation of Hardness

A hardness of a sample having a thickness of 2 mm was measured using a shore D hardness tester (ASKER, Japan) at room temperature.

PREPARATION EXAMPLE 1

Preparation of Base Film (TPU Film (A))

A TPU film was formed using a mixture of polyester polyol prepared by known esterification between adipic acid and 1,4-butanediol and having a weight average molecular weight (Mw) of approximately 2,000, methylenediphenyl diisocyanate (MDI), and 1,4-butanediol (chain extender) by a known method. Particularly, an isocyanate-terminated prepolymer was prepared by adding the polyester-based polyol and the methylenediphenyl diisocyanate to a reaction vessel in a weight ratio of 1:1.46 (polyester-based polyol: MDI), and adding nitrogen at 80° C. to react while stifling at a speed of 200 rpm. Subsequently, TPU was synthesized by further adding 14 parts by weight of a chain extender (1,4-butanediol) with respect to 100 parts by weight of the prepolymer, and adding nitrogen at 80° C. while stirring at a speed of 200 rpm to react until a content of isocyanate (NCO) in the reaction vessel approached 0. The synthesized TPU was casted, thereby forming a TPU film having a thickness of approximately 50 μm.

PREPARATION EXAMPLE 2

Formation of Base Film (TPU Film (B))

A TPU film having a thickness of approximately 50 μm was formed as described in Preparation Example 1, except that a mixture of 1,4-butanediol (BD) and neopentane glycol (NPG) in a weight ratio of 1:0.5 (BD:NPG) was used as a chain extender.

PREPARATION EXAMPLE 3

Formation of Base Film (TPU Film (C))

A TPU film having a thickness of approximately 50 μm was formed as described in Preparation Example 1, except that a mixture of 1,4-butanediol (BD) and neopentane glycol (NPG) in a weight ratio of 1:1.5 (BD:NPG) was used as a chain extender.

Characteristics of each film formed above are summarized and listed in Table 1.

TABLE 1

|  | TPU film | | | PVA resin film | Amorphous PET film |
| --- | --- | --- | --- | --- | --- |
|  | A | B | C | | |
| Tensile curve integral | 4343 | 7317 | 5404 | 1566 | 728 |
| Tensile strength | 51 | 83 | 53 | 53 | 66 |
| Elongation | 378 | 491 | 413 | 519.8 | 6.8 |
| Yield point | 22 | 83 | 46 | 53 | 66 |
| Elastic limit | 545 | 390 | 754 | 120 | 1404 |
| Recovery rate | 19 | 18.8 | 11.3 | — | — |
| MI | 30 | 30 | 30 | — | — |
| Hardness | 80D | 75D | 75D | — | — |

Tensile curve integral unit: Nmm
Tensile strength unit: MPa
Elongation unit: %
Yield point unit: MPa
Elastic limit unit: MPa
Recovery rate unit: %
MI (215° C. and 5 Kg base) unit: g/10 min
PVA resin film: film formed using known PVA resin in preparation of polarizing film (thickness: approximately 30 μm)
Amorphous PET film (manufacturer: LG Hausys)

EXAMPLE 1

A laminate was formed by stacking the PVA resin film shown in Table 1 on one surface of the TPU film (A) formed in Preparation Example 1 using a water-based PVA-based adhesive. Subsequently, the laminate was dipped in a dying solution (solvent: water) including iodine and potassium iodide at approximately 30° C. for a suitable period of time to adsorb iodine to the PVA resin film. A content of iodine in the dying solution was approximately 0.1 part by weight with respect to 100 parts by weight of water, and a content of potassium iodide was approximately 0.7 parts by weight with respect to 100 parts by weight of water. Subsequently, the laminate was dipped in a boric acid aqueous solution including boric acid and potassium iodide at approximately 60° C., and elongated until the final thickness of the PVA resin film approached approximately 5.8 μm (draw ratio: approximately 5.6 folds). As the result of measurement after the PVA resin film was peeled off from the elongated laminator, it was confirmed that a polarizing film having a transmissivity of approximately 40% or more and a polarization degree of 99% or more was formed.

EXAMPLE 2

A polarizing film was formed by the same method as described in Example 1, except that the TPU film (B) formed in Preparation Example 2 was used. The formed polarizing film had a transmissivity of approximately 40% or more, and a polarization degree of approximately 99% or more.

EXAMPLE 3

A polarizing film was formed by the same method as described in Example 1, except that the TPU film (C) formed in Preparation Example 3 was used. The formed polarizing film had a transmissivity of approximately 40% or more, and a polarization degree of approximately 99% or more.

COMPARATIVE EXAMPLE 1

A polarizing film was formed by the same method as described in Example 1, except that an amorphous PET film shown in Table 1 was used instead of a TPU film. However, in this case, a polarizing film exhibiting a suitable performance could not be formed since the PVA resin film was broken or curling occurred poorly as a draw ratio increased.

EXPLANATION OF THE MARKS

100: the laminate
101: the base film
102: the polarizing material layer or polarizing layer

What is claimed is:
1. A polarizing film, comprising:
an elongated laminate, wherein the elongated laminate comprises:
a base film;
an adhesive layer; and
a polarizing material layer disposed on one or both surfaces of the base film via the adhesive layer, wherein the elongated laminate is prepared by assembling the base film, the adhesive layer and the polarizing material layer into a laminate, and then elongating the assembled laminate at a draw ratio of 5.6 to 15 fold to form the elongated laminate,
wherein the base film includes thermoplastic polyurethane,
wherein the thermoplastic polyurethane is a reaction product of a mixture including a polyol component, 1 to 50 parts by weight of a polyvalent isocyanate compound with respect to 100 parts by weight of the polyol component, and 0.1 to 30 parts by weight of a chain extender with respect to 100 parts by weight of the polyol component,
wherein an absolute value of a difference in an elongation at break between the base film and the polarizing material layer ranges from 15 to 141.8%, and
wherein an absolute value of a difference in elastic limit between the base film and the polarizing material layer is 1,000 MPa or less.
2. The polarizing film according to claim 1, wherein an absolute value of a difference in a tensile curve integral between the base film and the polarizing material layer ranges from 1,500 to 10,000 Nmm.
3. The polarizing film according to claim 1, wherein an absolute value of a difference in tensile strength between the base film and the polarizing material layer ranges from 0.5 to 40 MPa.
4. The polarizing film according to claim 1, wherein an absolute value of a difference in yield point between the base film and the polarizing material layer ranges from 1 to 50 MPa.
5. The polarizing film according to claim 1, wherein the base film has a recovery rate of 30% or less.
6. The polarizing film according to claim 1, wherein the polarizing material layer includes a polyvinylalcohol-based resin.
7. The polarizing film according to claim 1, wherein the polarizing material layer has a thickness of 15 to 100 μm prior to elongation of the laminate.
8. A method of forming a polarizing film, comprising:
assembling a laminate, the laminate comprising a base film, an adhesive layer, and a polarizing material layer disposed on one or both surfaces of the base film via the adhesive layer; and
elongating the assembled laminate at a draw ratio of 5.6 to 15 fold,
wherein the base film includes thermoplastic polyurethane,
wherein the thermoplastic polyurethane is a reaction product of a mixture including a polyol component, 1 to 50 parts by weight of a polyvalent isocyanate compound with respect to 100 parts by weight of the polyol component, and 0.1 to 30 parts by weight of a chain extender with respect to 100 parts by weight of the polyol component,
wherein an absolute value of a difference in an elongation at break between the base film and the polarizing material layer ranges from 15 to 141.8%, and
wherein an absolute value of a difference in elastic limit between the base film and the polarizing material layer is 1,000 MPa or less.
9. The method according to claim 8, further comprising adsorbing a dichroic material to the polarizing material layer before the assembled laminate is elongated.
10. The method according to claim 8, wherein the polarizing material layer has a thickness of 10 μm or less after the assembled laminate is elongated.
11. The method according to claim 8, further comprising:
removing the elongated base film and adhesive layer from the elongated polarizing material layer.
12. The method according to claim 8, wherein the assembled laminate is elongated in an aqueous solution at a temperature ranging from 20 to 80° C.
13. The method according to claim 12, wherein the aqueous solution is a boric acid aqueous solution.
14. An elongated polarizing layer prepared by a method comprising:
assembling a laminate, the laminate comprising a base film, an adhesive layer, and a polarizing material layer disposed on one or both surfaces of the base film via the adhesive layer;
elongating the assembled laminate; and
removing the elongated base film and the adhesive layer from the elongated polarizing material layer,
wherein the base film includes thermoplastic polyurethane,
wherein the thermoplastic polyurethane is a reaction product of a mixture including a polyol component, 1 to 50 parts by weight of a polyvalent isocyanate compound with respect to 100 parts by weight of the polyol component, and 0.1 to 30 parts by weight of a chain extender with respect to 100 parts by weight of the polyol component, wherein an absolute value of a difference in an elongation at break between the base film and the polarizing material layer ranges from 15 to 500%, and wherein an absolute value of a difference in elastic limit between the base film and the polarizing material layer is 1,000 MPa or less.

* * * * *